May 5, 1936.  J. D. RITENOUR  2,039,661
FILM OPERATED SWITCH MECHANISM
Filed Feb. 5, 1934
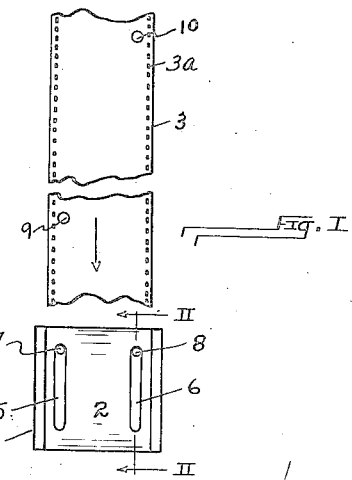
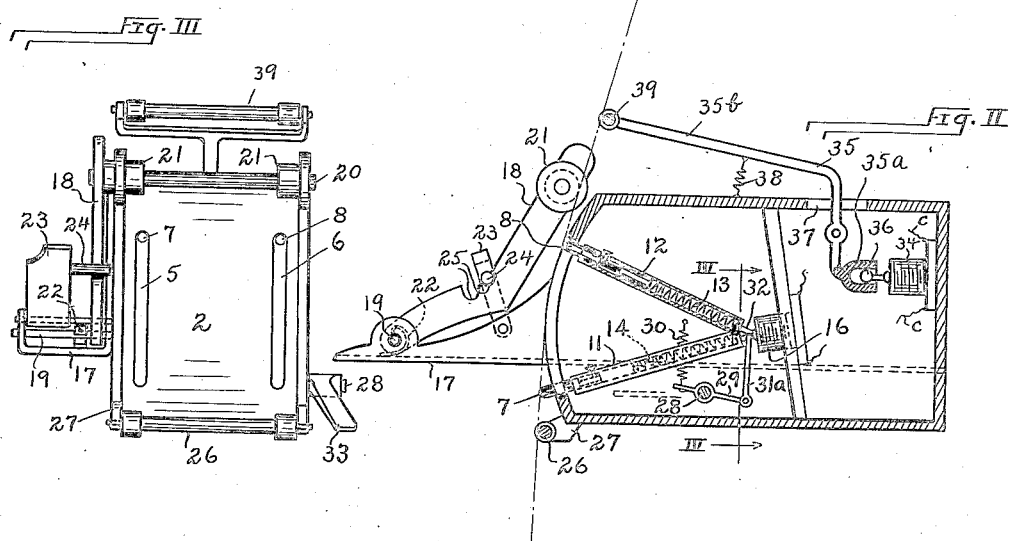
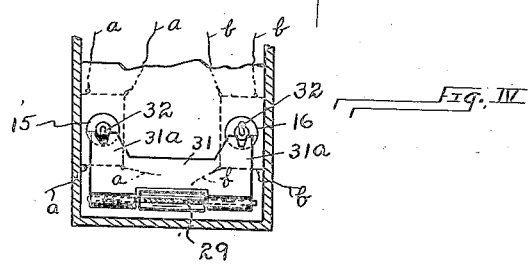
INVENTOR
John D. Ritenour
by Christy and Wharton
attorneys Patented May 5, 1936

2,039,661

UNITED STATES PATENT OFFICE 2,039,661

FILM OPERATED SWITCH MECHANISM

John D. Ritenour, New Kensington, Pa.

Application February 5, 1934, Serial No. 709,711

5 Claims. (Cl. 200—52)

This invention relates to film-operated switch mechanism for use in controlling circuits associated with motion picture projection apparatus, and particularly to film-operated switch mechanism suitable for use in initiating an automatic changeover between two motion picture projection assemblies.

An object of the invention is to provide in motion picture projection assemblies switch mechanism of such structure, and having such cooperation with the film that it is operated with certainty by the film, regardless of ragged edge condition of the film resulting from continued use.

Another object of the invention is to provide film operated switch mechanism, structurally simple and compact, which is capable of controlling two or more circuits, which may be associated with instrumentalities for effecting change-over action between projection assemblies.

Another object of the invention is to provide switch mechanism of the nature above noted, in which the switch elements, cooperating with the motion picture film, may readily be reset following action upon the switch elements by the motion picture film.

A further object of the invention is to provide in physical association with, and in cooperative relation with, the switch mechanism proper, an auxiliary switch arranged to control a circuit, and operatively to function upon breakage of the motion picture film, or upon complete unwinding of the film from a supply reel by which it is carried.

In the accompanying drawing Fig. I is a front elevation of a casing containing the switch mechanism of the invention, such casing being shown diagrammatically, and illustrating the cooperative relation of a motion picture film with respect to the switch mechanism; Fig. II is a vertical, sectional view, taken on the plane II—II of Fig. I, showing the elements of the film-operated switch mechanism in structural detail; Fig. III is a front elevation of the switch mechanism shown in section in Fig. II; Fig. IV is a fragmentary cross section of the switch mechanism, taken on the section line IV—IV of Fig. II.

In the accompanying drawing, and referring particularly to Fig. I, reference numeral 1 designates a housing for the switch mechanism. In a forward curved face 2 of this housing, which is presented toward a motion picture film 3, are spaced vertical slots 5 and 6, through which project film-contacting fingers 7 and 8. These fingers 7 and 8 are arranged to cooperate with circular openings 9 and 10 in the film 3, which film openings 9 and 10 lie in the body of the film inwardly of the sprocket perforations 3a along the film edges. As appears in Fig. I, perforations 9 and 10 are spaced from each other longitudinally of the film, and are spaced from each other transversely of the film a distance equal to the relative spacing of fingers 7 and 8.

Referring particularly to Fig. II of the drawings, it will be seen that the film-engaging fingers 7 and 8 are slideably mounted in tubular arms 11 and 12, respectively, and that they are urged forwardly of the arms 11 and 12, to project into and through slots 5 and 6 by coil springs 13 and 14 housed in the arms. The arms 11 and 12, respectively, control toggle switches 15 and 16, arranged to make and break connection, respectively, between conductors a, a and conductors b, b.

Referring still particularly to Fig. II of the drawing, it will be seen that the forward face 2 of the housing 1 is curved, and that the film 3 is caused to contact this face throughout a vertical extent of the face at which the fingers 7 and 8 normally project. Film 3 is caused to bear against this region of the curved face 2, and to depart from the curved face in the lower region thereof, by film tensioning means arranged to bear against the outer or opposite face of the film. Such tensioning means comprise a bracket 17, which projects forwardly beyond the face 2 of the switch housing, and an irregularly shaped arm 18 pivoted at 19 in the bracket. Rotatably mounted adjacent the distal end of arm 19 is a lateral shaft or bar 20, which carries film contacting spools 21. At the proximal end of arm 18 a leaf spring 22 exerts a force tending to urge the arm 18 in a direction to carry shaft or bar 20 away from the forward face 2 of the housing. This tendency is resisted by a trigger 23 pivoted in bracket 17, and carrying a finger 24, arranged to lie against the outer face of arm 19 in one or the other of two notches 25.

At the lower end of housing face 2 a roller bar 26, mounted in a fixed bracket 27, holds the film away from the lower region of the housing face.

Toggle switches 15 and 16 are film operated by engagement of fingers 7 and 8 in the film apertures 9 and 10. Taking the position of the parts shown in Fig. II of the drawing, this position has been produced by the engagement of finger 7 in film aperture 9, which engagement has swung the arm 11 downwardly, by movement of the film, into a lower position in which the finger rides out of the film aperture. This swinging movement of the arm has operated toggle switch 15, to make or break contact between the conductors *a, a* associated with it.

In the position shown in Fig. II, finger 8 contacts the inner face of the film 3 in alignment with the aperture 10 therein. When, therefore, the film has so progressed that aperture 10 in the film matches with a finger 8, this finger also enters its cooperative aperture, and arm 12, by which it is carried, is swung downwardly into a position parallel to arm 11. This swinging movement similarly operates toggle switch 16, to make and break contact between the conductors *b, b*.

Simple resetting means are provided. The resetting means comprise a shaft 28, which is rotatably mounted transversely of the housing 1, and which has fixed thereto a flat bar 29. Adjacent its forward edge, bar 29 is connected to a spring 30, having its opposite terminal attached in the housing. At its inner or rearward extremity, bar 29 has swinging connection with a plate 31. Referring to Fig. IV of the drawing, it will be seen that plate 31 has two upwardly projecting portions 31a which are notched to engage the constricted switch levers 32 on which switch-operating arms 11 and 12 are mounted.

By revolving shaft 28, as by means of a thumb plate 33, fixed to the shaft exteriorly of the housing, the forward end of plate 29 is depressed against the resistance of spring 30, bearing upwardly against the throwing levers 32 of the two toggle switches, and swinging the switch-operated arms into their normal or set position, in which they may contact the inner face of the film 3 in alignment with the film apertures 9 and 10, and preparatory to engagement in the film apertures.

Associated in the housing 2 is an additional toggle switch 34 arranged to make or brake contact between conductors *c, c*. The throwing lever 36 is engaged by the terminally cupped, or forked, arm 35a of a pivotally mounted bell crank 35, which projects upwardly beyond housing 1 through an opening 37 in the upper wall of the housing, and which extends forwardly along the housing into the region of the film 3. The forwardly extending arm 35b of the bell crank is resiliently urged toward the upper wall of the housing by a coil spring 38 connected between this arm of the bell crank and the housing wall.

Referring to Fig. III of the drawing, it will be seen that the forward, or distal, end of bell crank arm 35b is forked, for the mounting of film-contacting roller 39. Under normal conditions, in which the film is carried past the switch mechanism without engagement of either of the fingers 7 or 8 in one of the film apertures 9 or 10, this supplementary assembly serves as a film tightener, holding the film against film-tensioning bar 21, and contributing to the proper direction of the film into contact with that region of the curved face 2 through which the film-engaging fingers 7 and 8 project. It will be noted that arm 35b of the bell crank extends upwardly, as well as forwardly, and that the pressure of the film thereagainst counteracts the force exerted by coil spring 38, which latter force tends to swing the bell crank. When, therefore, due either to film breakage or to complete unwinding of the film from its supply reel, the bell crank is relieved of the pressure exerted thereon by the film, the bell crank rotates under the influence of spring 38, throwing toggle switch 34.

This last considered assembly has, therefore, a function during the running of a motion picture film during projection, and has also a circuit-controlling function performed by it when relieved of film pressure. This latter function is to so control a circuit that a motor propelling the film is deactivated, and other incidental results are obtained either at the termination of projection by complete unwinding of the film, or under breakage, or other abnormal condition, of the film, which might render a safety control effect desirable.

I claim as my invention:

1. Switch mechanism for controlling circuits associated in motion picture projecting apparatus comprising a pair of switch elements arranged each in alternative positions to complete and to interrupt an electrical current path, arms swingingly mounted in cooperative relation with said switch elements, said arms swingingly movable in two directions respectively each to control movement of its associated switch element from one of its alternative positions, film-engaging fingers carried by said switch-actuating arms and yieldingly forced longitudinally therebeyond, film guiding means arranged to guide a film into contact with said film engaging fingers, whereby the said actuating arms are moved in one swinging direction by movement of a film engaged by the fingers carried thereby, and means for oppositely swinging said switch-actuating arms.

2. Switch mechanism for controlling circuits associated in motion picture projecting apparatus comprising a switch element movable into alternative positions respectively to connect and disconnect electrical conductors, a switch operating arm mounted for swinging movement from set position into inoperative position and in said swinging movement acting to shift said switch element from one to the other of its alternative positions, in combination with a motion picture film having a perforation therein, and means for guiding said motion picture film into contact with said switch-operating arm and with the perforations therein in alignment with said switch-operating arm, whereby in engagement of the film perforation with the switch-operating arm film movement moves the said arm from its set position into its inoperative position.

3. The herein described combination in accordance with claim 2 comprising additionally means for swinging said switch-operating arm from inactive position to set position, and for returning said switch element to the position from which it has been moved by the action of said switch-operating arm.

4. The combination of switch mechanism for controlling circuits associated in motion picture projecting apparatus, said switch mechanism comprising a pair of spaced switch elements arranged each in alternative positions to connect and to disconnect electrical conductors, arms swingingly mounted in cooperation with said switch elements and transversely spaced from each other, said arms having connection with the switch elements such that swinging movement of the arms and movement of the switch elements into their alternative positions are mechanically related, and yielding terminal members at the outer extremities of said arms; with a motion picture film having therein two perforations spaced both longitudinally and laterally from each other, and guiding means arranged to guide the said film into contact with the yielding terminals of said switch-operating arms with the perforations therein each in alignment with one of the said yielding arm terminals, whereby in movement of said motion picture film the said arms are swung successively each to shift the switch element associated with it from one to the other of its alternative positions.

5. The herein described combination in accordance with claim 4 comprising additionally means for returning said switch-operating arm and said switch element to the positions from which they have been moved by engagement of the switch actuating arms with the film.

JOHN D. RITENOUR.